United States Patent
Schulz

(10) Patent No.: US 9,086,037 B2
(45) Date of Patent: Jul. 21, 2015

(54) TANK VENTILATION WITH A VENTURI NOZZLE

(71) Applicant: Dr. Ing. h.c.F. Porche Aktiengesellschaft, Stuttgart (DE)

(72) Inventor: Helmut Schulz, Tiefenbronn (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 294 days.

(21) Appl. No.: 13/661,056

(22) Filed: Oct. 26, 2012

(65) Prior Publication Data

US 2013/0104857 A1  May 2, 2013

(30) Foreign Application Priority Data

Oct. 27, 2011 (DE) .......................... 10 2011 054 851

(51) Int. Cl.
- *F02M 25/08* (2006.01)
- *F02D 41/00* (2006.01)
- *B60K 15/035* (2006.01)

(52) U.S. Cl.
CPC ............. *F02M 25/089* (2013.01); *B60K 15/035* (2013.01); *F02D 41/0007* (2013.01); *F02D 41/0032* (2013.01); *F02M 25/0818* (2013.01)

(58) Field of Classification Search
CPC ............ F02M 25/089; F02M 25/0818; F02M 25/0836; F02D 41/0032; F02D 41/0007

USPC ....................... 123/516, 518, 519, 520, 559.1
See application file for complete search history.

(56) References Cited

U.S. PATENT DOCUMENTS

| | | | |
|---|---|---|---|
| 5,005,550 A | 4/1991 | Bugin et al. | |
| 5,245,974 A | 9/1993 | Watson et al. | |
| 5,269,278 A * | 12/1993 | Heinemann et al. | 123/520 |
| 5,979,418 A * | 11/1999 | Saruwatari et al. | 123/519 |
| 7,284,541 B1 * | 10/2007 | Uchida et al. | 123/520 |
| 7,316,223 B2 * | 1/2008 | Wakahara | 123/520 |
| 7,966,996 B1 | 6/2011 | Pursifull | |
| 2011/0307157 A1 * | 12/2011 | Pursifull | 701/102 |

FOREIGN PATENT DOCUMENTS

DE  102007040913 A1  3/2009

OTHER PUBLICATIONS

German Patent Office, Search Report in German Patent Application No. 10 2011 054 851.3 (Jun. 19, 2012).

* cited by examiner

*Primary Examiner* — Mahmoud Gimie
(74) *Attorney, Agent, or Firm* — Leydig, Voit & Mayer, Ltd.

(57) ABSTRACT

A tank ventilation system of a motor vehicle includes a vapor filter, a first line connecting the vapor filter at a corresponding first introduction point to a suction pipe, and a second line connecting the vapor filter at a corresponding second introduction point to an environment line. The second introduction point is arranged between an air filter and a compressor of the environment line. The second line includes a Venturi nozzle configured to remove carrier flow from downstream of the compressor and upstream of the throttle valve.

11 Claims, 6 Drawing Sheets

TANK VENTILATION WITH A VENTURI NOZZLE

CROSS REFERENCE TO RELATED APPLICATIONS

This application claims priority to German Patent Application No DE 10 2011 054 851.3, filed Oct. 27, 2011, which is hereby incorporated by reference herein in its entirety.

FIELD

The invention relates to a tank ventilation system of a motor vehicle.

BACKGROUND

Motor vehicles are as a rule equipped with tank ventilation systems for setting desired pressure ratios within a fuel tank provided in each motor vehicle. Above all, such systems prevent enrichment of hydrocarbons, which are released from the corresponding fuel, in the gas phase.

So that hydrocarbons do not pass into the environment, the tank ventilation systems for absorbing fuel vapors are provided with special filters, generally activated carbon filters. A vapor filter of this type is a filter which is impermeable to fuel vapor. Furthermore, a tank ventilation system comprises an engine line Which leads from the vapor filter to an intake system or a suction system of the internal combustion engine and in which a controllable tank ventilation valve is arranged. So that such activated carbon filters do not lose their adsorption capability, they have to be purged or cleaned during operation of the engine.

It is known to act upon the activated carbon via the tank ventilation valve with negative pressure from a suction pipe of the suction system of the particular internal combustion engine, such that the activated carbon filter is purged via a fresh air line arranged in the remaining internal combustion engine system. Said purging air which is enriched with fuel vapor is supplied again in the region of the suction pipe of the internal combustion engine to the combustion. The activated carbon filter is therefore purged with ambient air via the negative pressurization of the suction pipe and, as a result, is passively regenerated. In this case, fuel vapors are supplied to the combustion depending on the negative pressure in the suction pipe. A disadvantage in this case is that, when there is low negative pressure in the suction pipe of the internal combustion engine, when the throttle valve is wide open, purging air sucked up via the activated carbon filter is insufficient to regenerate and purge the latter. Such a situation occurs, for example, in the case of supercharged engines, i.e. internal combustion engines in the supercharged mode, since there is then scarcely any negative pressure in the corresponding suction system.

SUMMARY

In an embodiment, the present invention provides a tank ventilation system of a motor vehicle including a vapor filter, a first line connecting the vapor filter at a corresponding first introduction point to a suction pipe, and a second line connecting the vapor filter at a corresponding second introduction point to an environment line. The second introduction point is between an air filter and a compressor on the environment line. The second line includes a Venturi nozzle configured to remove carrier flow from downstream of the compressor and upstream of a throttle valve.

BRIEF DESCRIPTION OF THE DRAWINGS

Exemplary embodiments of the present invention are described in more detail below with reference to the drawings. The features explained below can be used not only in the respectively stated combination but also in different combinations or on their own without departing from the scope of the present invention. In the drawings.

DETAILED DESCRIPTION

Figure 1A:
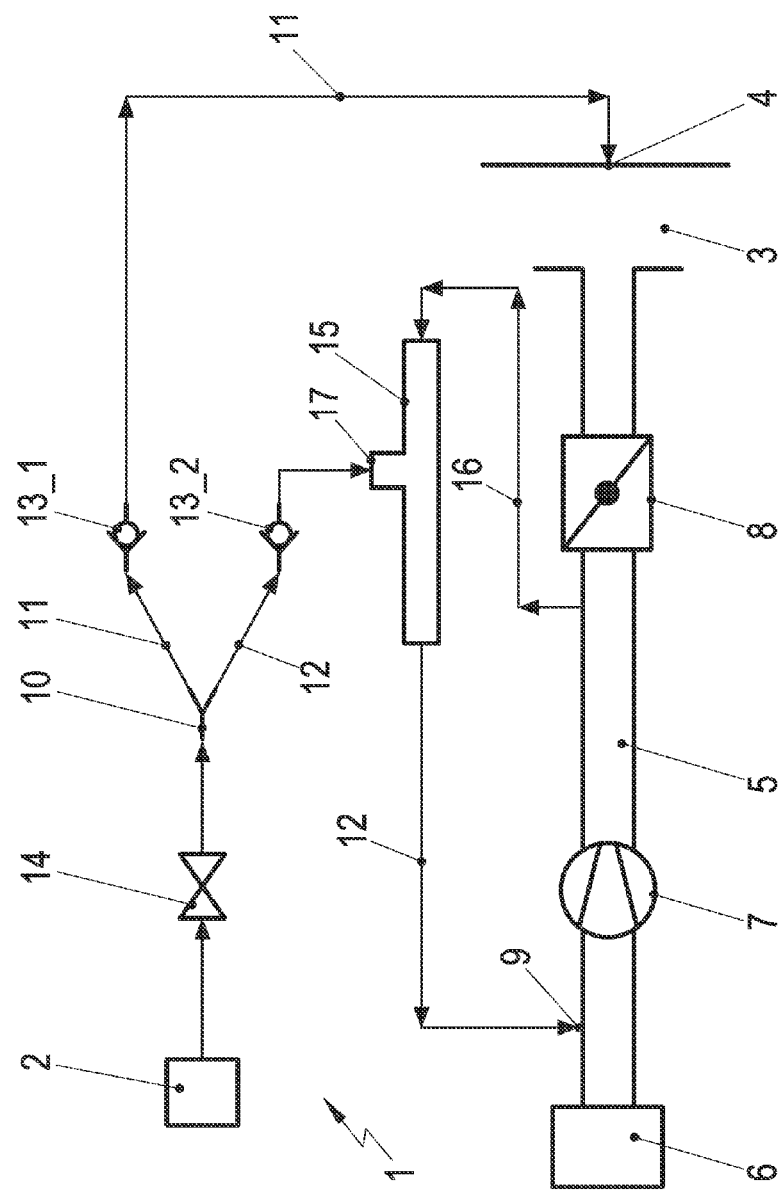
FIG. 1A shows, in a schematic illustration, an embodiment of a tank ventilation system according to the invention.

In an embodiment, the present invention provides a tank ventilation system which permits purging of the activated carbon filter even in the supercharged mode of a motor vehicle engine. Furthermore, a method for controlling a tank ventilation system according to the invention is intended to be provided.

In an embodiment, the present invention provides a tank ventilation system for motor vehicles, which comprises a vapor filter which is connected via a first line and a corresponding first introduction point to a suction pipe, and via a second line and a corresponding second introduction point to an environment line.

In this case, the second introduction point is arranged between an air filter and a compressor on the environment line. Furthermore, the second line comprises a Venturi nozzle which is operated by removal of a carrier flow between the compressor and a throttle valve.

In this case, the pressure differential between the pressure downstream of the compressor and pressure upstream of the compressor is used in order to operate the Venturi nozzle. An air mass flow is removed here downstream of the compressor and upstream of the throttle valve as a carrier flow and conducted into the Venturi nozzle.

A suction pipe should be understood as meaning a component which is attached directly to a cylinder head of an internal combustion engine, in particular a motor vehicle internal combustion engine, and supplies the sucked-up air or the sucked-up air/fuel mixture to inlet ducts of the individual cylinders of the corresponding internal combustion engine, in particular motor vehicle internal combustion engine.

A Venturi nozzle consists of a smooth-walled pipe piece with a cross-sectional narrowing, for example, by means of two cones directed counter to each other and combined at the location of the smallest diameter thereof. At this location, a removal pipe is placed orthogonally with respect to the longitudinal axis of the pipe piece. If a gaseous or liquid medium flows through the Venturi nozzle, the dynamic pressure (banking-up pressure) is at maximum and the static pressure (initial pressure) is at minimum at the narrowest point of the pipe piece. The velocity of the flowing gas (or of the liquid) rises in proportion to the cross section during flow through the constricted part, i.e. the cross-sectional narrowing, because the same quantity flows through overall. At the same time, the pressure drops in the removal pipe which fits precisely in the narrow or constricted part. This gives rise to a negative pressure which is used for sucking up liquids or gases.

In the tank ventilation system according to the invention, the negative pressure in the Venturi nozzle causes air to be sucked via the second line through the vapor filter, thus regenerating the vapor filter. The carrier flow together with the air sucked through the vapor filter is conducted to the introduction point on the environment line between the air filter and the compressor. As a result, the vapor filter can be regenerated in the supercharged mode of the corresponding internal combustion engine or of the corresponding engine even if only a small negative pressure, if any at all, prevails in the suction pipe.

In contrast to the possible alternative of removing the carrier flow downstream of the throttle valve, the removal of the carrier flow upstream of the throttle valve directly downstream of the compressor affords the advantage that an increase in the regenerating capacity of the vapor filter is obtained as early as in the transition region between suction mode and supercharged mode, since there is already positive pressure upstream of the throttle valve, while negative pressure still prevails downstream of the throttle valve. The positive pressure makes it possible for a partial mass flow to be removed and conducted into the Venturi nozzle, as a result of which, as already described above, the vapor filter is regenerated.

In an embodiment of the tank ventilation system according to the invention, the first line and the second line each have a tank ventilation valve. By means of the use of one tank ventilation valve per line in each case, both partial flows which flow through the first line and through the second line are decoupled from the pressure such that both partial flows can flow at the same time.

In another embodiment of the tank ventilation system according to the invention, the latter has a tank ventilation valve. Said tank ventilation valve is arranged between the vapor filter and the first line and second line.

In a further embodiment, the first line and the second line are connected to the tank ventilation valve via a Y piece.

The use of a tank ventilation valve means that it is recommended, in order to ensure an optimized purging effect, that air flows only through that line of the two lines, the first line and the second line, to which the greater negative pressure is applied. In this case, the line containing the smaller negative pressure is intended to be closed.

In an embodiment of the tank ventilation system according to the invention, the first line and the second line can each be closed by a nonreturn valve. Provision is made for the nonreturn valves to be arranged in the direction of flow at the beginning of the corresponding lines in the vicinity of the tank ventilation valve. The nonreturn valves ensure that the line containing the smaller negative pressure is closed while the line containing the greater negative pressure remains open.

In the supercharged mode of the corresponding engine or corresponding internal combustion engine, only a small negative pressure, if any at all, prevails in the suction pipe, while a certain greater negative pressure is present in the Venturi nozzle. As a result, air is sucked via the second line through the vapor filter and the tank ventilation valve. The nonreturn valve in the second line remains open while the nonreturn valve in the first line is closed.

By contrast, in the suction mode, the negative pressure in the suction pipe is greater than the negative pressure generated in the Venturi nozzle. As a result, the nonreturn valve in the second line is closed, and air flows from the vapor filter and the tank ventilation valve via the first line into the suction pipe.

In an embodiment of the tank ventilation system according to the invention, the vapor filter is an adsorption filter, for example an activated carbon filter.

Furthermore, a motor vehicle with a tank ventilation system according to the invention, and a method for controlling a tank ventilation system according to the invention are provided.

The invention is illustrated schematically in the drawing using (an) embodiment and is described schematically and in detail with reference to the drawing.

FIG. 1A shows, in a schematic illustration, an embodiment of a tank ventilation system 1 according to the invention. The tank ventilation system comprises a first line 11 which connects a vapor filter 2 to a suction pipe 3, The first line 11 leads into the suction pipe 3 at an introduction point 4. A second line 12 connects the vapor filter 2 to an environment line 5 which, for its part, supplies the suction pipe 3 with air from the environment, The environment line 5 has an air filter 6, a compressor (exhaust gas turbocharger) 7 and a throttle valve 8 upstream, i.e. from the environment in the direction of the suction pipe 3. An introduction point 9 of the second line 12 is provided between the air filter 6 and the compressor 7. The second line has a Venturi nozzle 15 which is operated by a carrier flow 16 which is removed from the environment line 5 upstream of the throttle valve 8 and downstream of the compressor 7. The first line 11 and the second line 12 are combined at one end by a distributor piece 10. Directly upstream of the end of the first and the second line 11, 12, upstream of the distributor piece 10, respective nonretum valves 13_1, 13_2 are arranged on each line 11, 12. A tank ventilation valve 14 is arranged between the vapor filter 2 and the branching of the first and second lines 11, 12 at the distributor piece 10, said tank ventilation valve metering the air flow through the vapor filter 2 depending on the operating state of a corresponding internal combustion engine, in particular of a corresponding engine.

The vapor filter 2, which is, as a rule, an activated carbon filter, adsorbs hydrocarbon vapors from a fuel tank (not shown) and thus prevents said hydrocarbon vapors from entering the environment. So that such activated carbon filters do not lose their adsorption capability, they have to be freed from fuel vapors or cleaned during operation of the engine. This is achieved by the vapor filter 2 being acted upon via a tank ventilation valve 14 with negative pressure from the suction pipe 3 such that the activated carbon filter 2, which obtains fresh air via a fresh air line (not shown) arranged in the remaining system of a respective internal combustion engine, is purged. This purging air which is enriched with fuel vapor is supplied again to the combustion via the first line 11 in the region of the suction pipe 3 of the internal combustion engine.

This method of purging the vapor filter 2 functions as long as there is a suitable negative pressure in the suction pipe 3. If there is no negative pressure in the suction pipe, for example in the case of supercharged engines in the supercharged mode, the vapor filter 2 cannot be purged in the way described above. In order to be able to purge the vapor filter 2 with fresh air even in the supercharged mode, the tank ventilation system 1 has a Venturi nozzle 15 which is connected to the second line 12. The Venturi nozzle 15 consists of a smooth-walled pipe piece with a cross-sectional narrowing, for example by means of two oppositely directed cones which are combined at the point of the smallest diameter thereof. At this point, a removal pipe 17 is placed orthogonally with respect to the longitudinal axis of the pipe piece. If a gaseous medium flows through the Venturi nozzle 15, the corresponding banking-up pressure is at maximum and the corresponding initial pressure at minimum at the narrowest point of the pipe piece. The velocity of the flowing gas rises in proportion to the cross sections during flow through the cross-sectional narrowing or the constricted part because the same amount of gas flows through overall. At the same time, the pressure drops in the removal pipe 17 which sits precisely in the narrow part. This causes a negative pressure which is used for sucking up gases. The Venturi nozzle 15 is operated by a carrier flow by an air mass flow being removed from the environment line 5 downstream of the compressor 7 and upstream of the throttle valve 8 and being introduced into the Venturi nozzle 15. During the flow through the Venturi nozzle 15, a negative pressure is generated in the removal pipe 17, which is connected to the second line 12, as a result of which the activated carbon filter 2 is purged. The air flow flowing through the Venturi nozzle 15 is conducted via the line 12 to the introduction point 9 into the environment line between the air filter 6 and the compressor 7.

The tank ventilation valve 14 meters the air flow through the vapor filter 2 depending on the operating state of a corresponding engine and consequently depending on the negative pressure prevailing in the system. The air flow through the vapor filter is diverted at the distributor piece 10: either the air flow flows via the first line 11 into the suction pipe 3 or via the second line 12 through the Venturi nozzle 15 into the environment line 5, from which at least some of the air likewise reaches the suction pipe 3 via the compressor 7 and through the throttle valve 8. The route taken by the air flow is defined by the amount of negative pressure in the first line and in the second line. If the negative pressure in the first line 11 is greater than at the removal pipe 17, then the nonreturn valve 13_1 is open, while the corresponding nonreturn valve 13_2 of the second line 12 is closed, and therefore the air flow flows via the first line 11. Conversely, the nonreturn valve 13_1 is closed while the nonreturn valve 13_2 of the second line 12 is open if the negative pressure is greater at the removal pipe 17 than in the first line 11. Whether a greater negative pressure prevails in the first line 11 or at the removal pipe 17 depends crucially on the operating state of the engine. In a supercharged state, there is scarcely any negative pressure in the suction pipe 3 and consequently in the first line 11, and therefore the vapor filter is purged exclusively via the negative pressure generated by the Venturi nozzle 15. By contrast, in the suction mode, the negative pressure in the suction pipe 3 will be greater than in the Venturi nozzle 15, and therefore the air flow passes through the vapor filter 2 via the first line 11 into the suction pipe 3.

In contrast to the possible alternative of removing the carrier flow downstream of the throttle valve 8, the removal of the carrier flow upstream of the throttle valve 8 directly downstream of the compressor 7 affords the advantage that an increase in the regeneration capacity of the vapor filter 2 is obtained as early as in the transition region between suction mode and supercharged mode, since there is already positive pressure upstream of the throttle valve 8, while negative pressure still prevails downstream of the throttle valve 8. The positive pressure enables a partial mass flow to be removed and conducted into the Venturi nozzle 15, as a result of which, as already described above, the vapor filter 2 is purged.

Figure 1B:
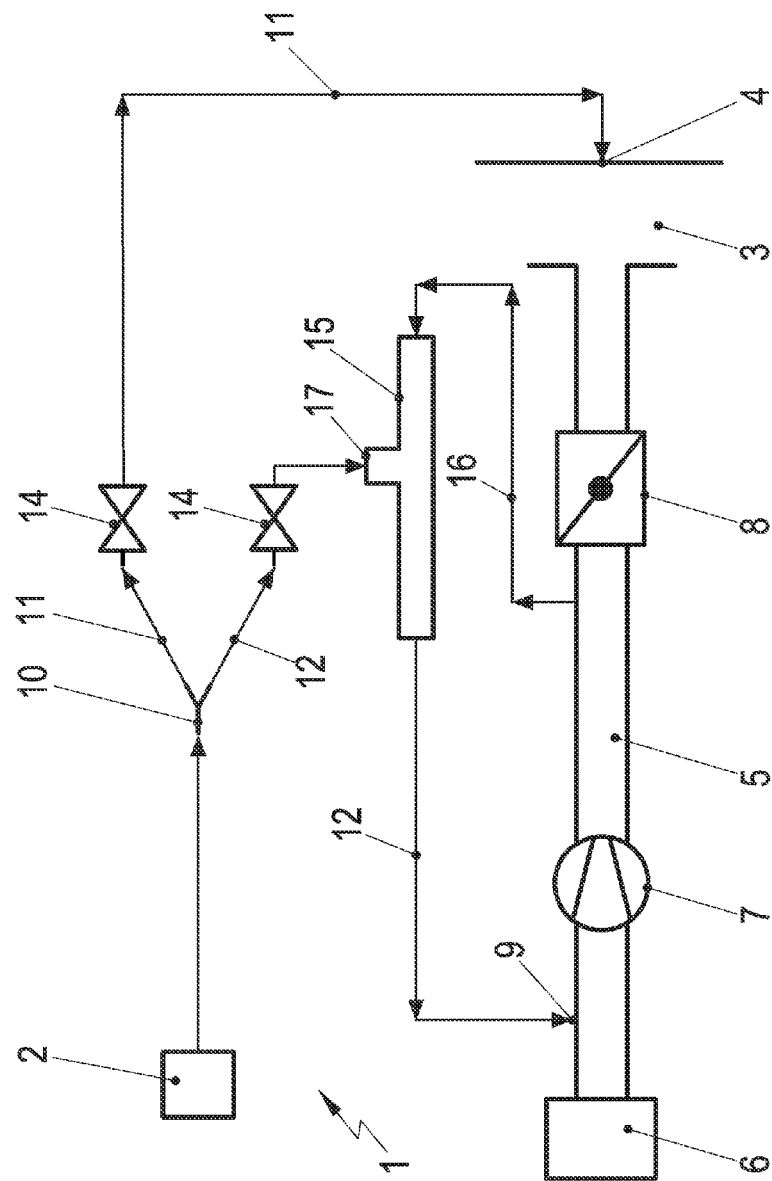
FIG. 1B shows, in schematic illustration, another embodiment of a tank ventilation system according to the invention.

The flow through the tank ventilation valve 14 shown in FIG. 1A is dependent on the pressure differential in the system. The pressure differential at the introduction point 4 downstream of the throttle valve 8 is the ambient pressure minus the pressure in the suction pipe 3. For the introduction point 9 upstream of the compressor 7, the pressure differential is equal to the negative pressure generated by the Venturi nozzle 15.

in FIG. 1B, each of the first line 11 and the second line 12 have a tank ventilation valve 14. By means of the use of one tank ventilation valve per line in each case, both partial flows which flow through the first line and through the second line are decoupled from the pressure such that both partial flows can flow at the same time.

Figure 2:
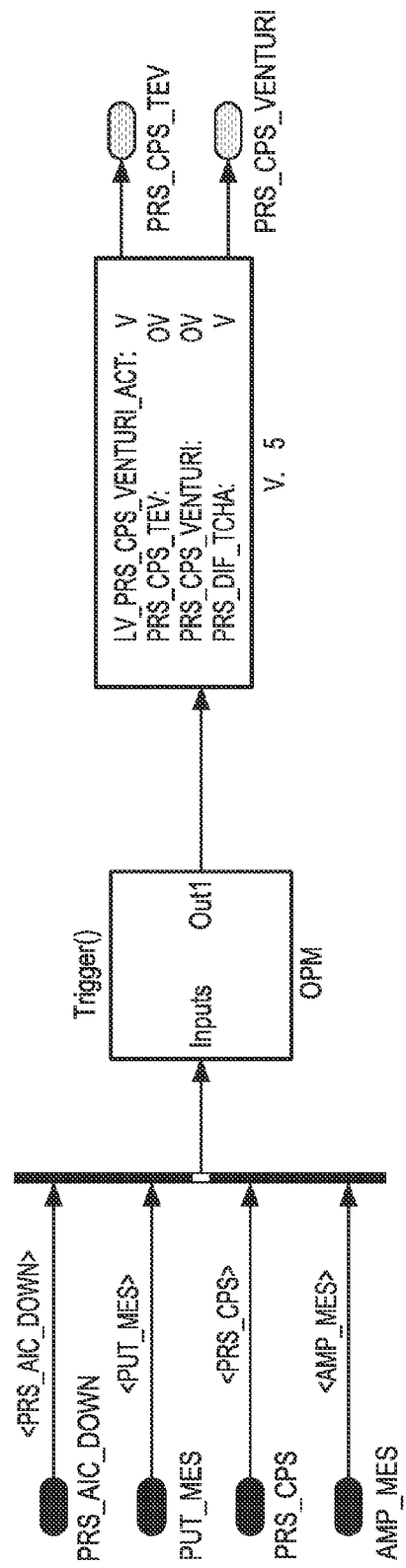
FIG. 2 shows a block diagram, on the basis of which one possible embodiment of the tank ventilation system according to the invention is controlled.

As shown in FIG. 2, the values for the pressure upstream of the compressor (PRS_AIC_DOWN), downstream of the compressor (PUT_MES), the pressure differential of environment and negative pressure in the suction pipe (PRS_CPS), and of the ambient pressure (AMP_MES) are supplied via inputs to a computer unit OPM which calculates the different pressure differentials in the system therefrom. Said values are forwarded via an outlet "Out1" to a further computer unit which, on the basis of said pressure differentials, establishes via which introduction point the air flow (regenerating mass flow) purging the vapor filter is supplied to the engine, i.e. either via the tank ventilation system with the pressure PRS_CPS_TEV or via the line which is operated via the Venturi nozzle and has the pressure PRS_CPS_VENTURI. Which introduction point is used is determined by LV_PRS_CPS_VENTURI-_ACT. From the particular pressure, it can be calculated in advance when the particular air flow enters the engine.

Figure 3:
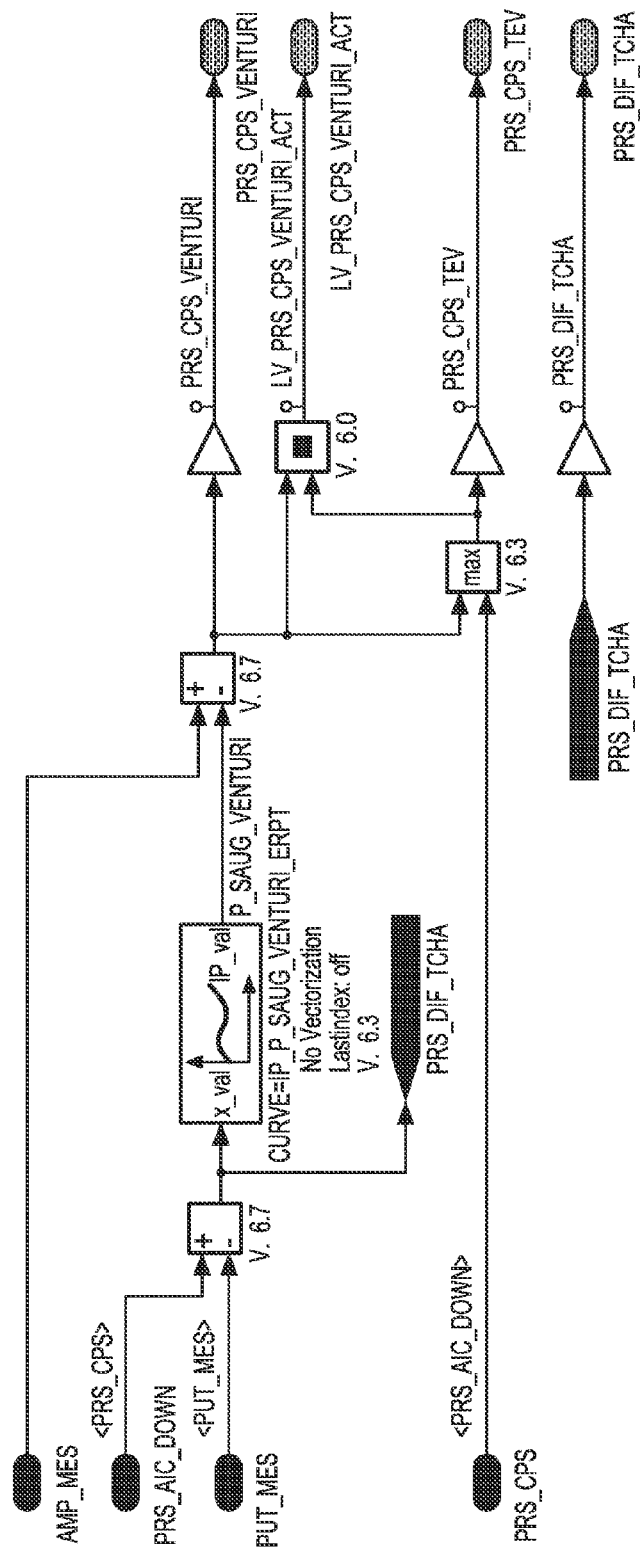
FIG. 3 shows a detailed block diagram according to FIG. 2.

FIG. 3 shows in more detail the computer unit described in FIG. 2. The negative pressure (P_SAUG_VENTURI) generated by the Venturi nozzle 15 is formed as a function of the pressure differential via the compressor 7, i.e. the difference in the pressure upstream of the compressor (PRS_AIC_DOWN) minus the pressure downstream of the compressor (PUT_MES) and stored in the characteristic IP_P_SAUG_VENTURI. It is also available in PRS_DIF_TCHA for further calculations.

P In the computer unit, a max selection takes place between the pressure differential at the introduction point 4 (PRS_CPS) and the pressure differential at the removal pipe 17 upstream of the compressor 7 (PRS_CPS_VENTURI). Depending on which negative pressure has the greater value, it is established Which nonreturn valve 13_1, 13_2 is open or closed. At the same time, the active line, i.e. the active introduction point, is determined with reference to the pressure comparison (LV_PRS_CPS_VENTURI_ACT).

Figure 4:
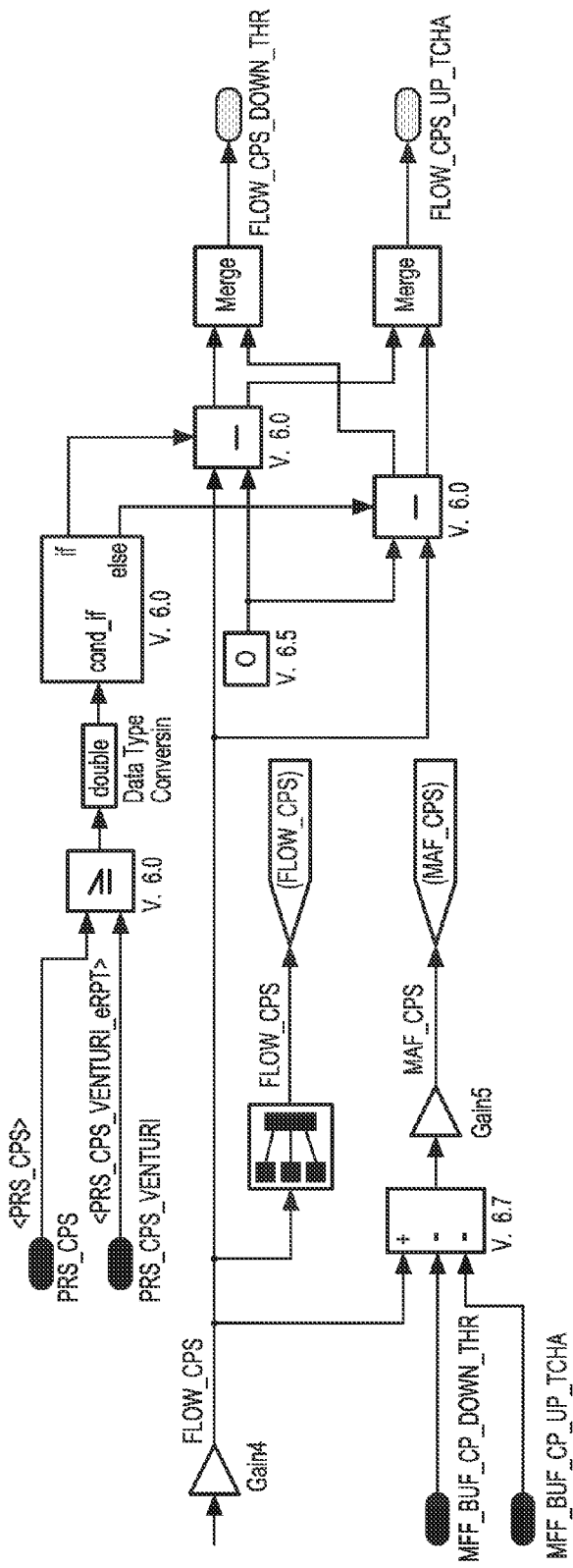
FIG. 4 shows a block diagram, on the basis of which one embodiment of the method according to the invention can be carried out.

The same applies as far as the air flows are concerned, as is apparent in FIG. 4. If the pressure differential at the introduction point 4 (PRS_CPS) is greater than or equal to the pressure differential at the removal pipe 17 (PRS_CPS_VENTURI), then the flow through the tank ventilation valve 14 (FLOW_CPS) passes via the introduction point 4 (FLOW_CPS_DOWN_THR) into the suction pipe 3. If by contrast, the pressure differential at the introduction point 4 (PRS_CPS) is smaller than the pressure differential at the removal pipe 17 (PRS_CPS_Venturi), then the flow through the tank ventilation valve 14 (FLOW_CPS) passes via the introduction point 9 (FLOW_CPS_UP_TCHA) upstream of the compressor.

Figure 5:
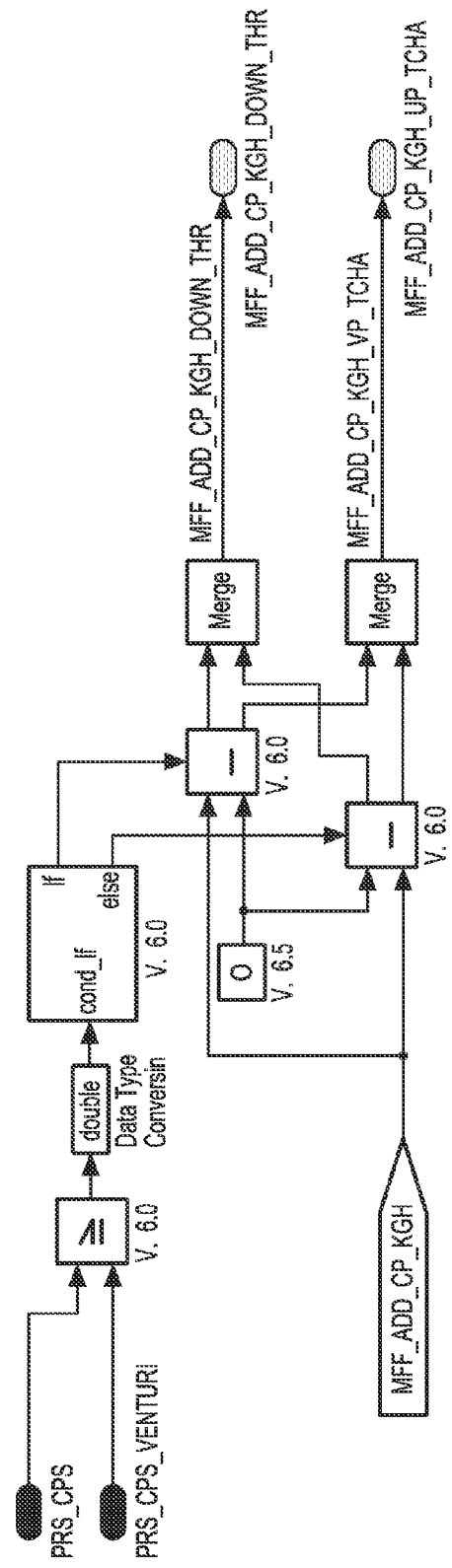
FIG. 5 shows a block diagram, on the basis of which a further embodiment of the method according to the invention can be carried out.

The same applies to the fuel contents, as is apparent in FIG. 5. If the pressure differential at the introduction point 4 (PRS_CPS) is greater than or equal to the pressure differential at the removal pipe 17 (PRS_CPS_VENTURI), then the flow passes through the tank ventilation valve 14 (FLOW_CPS)

via the introduction point 4 (FLOW_CPS_DOWN_THR) and the fuel content MFF_ADD_CP_KGH_DOWN_THR is obtained.

If, by contrast, the pressure differential at the introduction point 4 (PRS_CPS) is smaller than the pressure differential at the removal pipe 17 (PRS_CPS_VENTURI), then the flow passes through the tank ventilation valve 14 (FLOW_CPS) via the introduction point 9 (FLOW_CPS_UP_TCHA) upstream of the compressor, and the fuel content MFF_ADD_$_{CP}$_KGH_UP_TCHA is obtained.

The air mass, which is present in the combustion chamber of the corresponding internal combustion engine or of the corresponding engine, of the two partial flows from the tank ventilation is calculated from the total value of the two partial flows.

The fuel content in the combustion chamber of the two partial flows from the tank ventilation is calculated from the total value of the fuel contents of the two partial flows. The injection mass of the respective injectors is correspondingly corrected therefrom.

While the invention has been particularly shown and described with reference to preferred embodiments thereof, it will be understood by those skilled in the art that various changes in form and details may be made therein without departing from the spirit and scope of the invention.

List of Designations
ADD Additive
AFS Air Fuel Stoichiometric
AFU Air Fuel
AIC Air Cooler
AMP Ambient Pressure
BUF Buffer
CL Closed Loop
COR Correction
CPPWM Canister Purge Pulse Width Modulation
CP Canister Purge
CPS Canister Purge Solenoid
CTL Control
DIAGCP Diagnosis Canister Purge
DIF Differential
DLY Delay
DOWN_THR Downstream of Throttle Valve
eRPT External Rapid Prototyping (amended signal variable)
EVAC Evaporative Emission Control
EVAP Tank Ventilation System
FAC Factor
FIL Filter
FLOW Mass Flow
HOM Homogeneous
IP Interpolated Map
IT Internal
KGH Kg/h
LAM Lambda Control
LAMB Lambda
Logical Value
MAF Mass Air Flow
MAX Maximum
MEM Memorise
MFF Mass Fuel Flow
MMV Moving Mean Value
N Rotational speed
PHY Physical
PRS Pressure
PUT Pressure Upstream of Throttle
RAF Ratio of Air Fuel
RATIO Ratio
SP Set Point
STATE State
TCHA Turbocharger
TEV Tank Ventilation Valve
THR Throttle
TIA Temperature Intake Air
TQI Indicated Engi
UP_TCHA Upstream of Turbocharger

The invention claimed is:

1. A method of controlling a tank ventilation system, the method comprising:
providing a tank ventilation system including:
a vapor filter,
a first line connecting the vapor filter at a corresponding first introduction point to a suction pipe,
a second line connecting the vapor filter at a corresponding second introduction point to an environment line, the second line including:
a Venturi nozzle with an inlet end connected to the environment line upstream of a throttle valve and downstream of a compressor, and an outlet end connected to the environment line so as to form the second introduction point upstream of the compressor and downstream of an air filter, such that operation of the compressor results in a pressure differential that conducts carrier flow through the Venturi nozzle, the Venturi nozzle having a restricted section through which movement of the carrier flow results in a reduced pressure, and
a removal pipe in communication with the vapor filter and connected to the constricted section of the Venturi nozzle such that the reduced pressure resulting from the carrier flow causes fluid from the vapor filter to pass through the removal pipe and the outlet of the Venturi nozzle to the environment line at the second introduction point;
conveying an air flow through the tank ventilation system so as to purge the vapor filter;
measuring pressure values including at least one of:
pressure upstream of the compressor,
pressure downstream of the compressor,
pressure differential between a negative pressure in the suction pipe and environment, and
ambient pressure; and
calculating, using a computer, a path of the air flow purging the vapor filter based on the measured pressure values.

2. The method recited in claim 1, further comprising calculating when the air flow purging the vapor filter enters an engine.

3. The method recited in claim 1, further comprising determining a fuel content of the air flow based on the measured pressure values and modifying an injection mass through fuel injectors of an engine based on the determined fuel content.

4. The method recited in claim 1, wherein each of the first line and the second line includes a tank ventilation valve.

5. The method recited in claim 1, wherein the tank ventilation system includes a tank ventilation valve between the vapor filter and the first and second lines.

6. The method recited in claim 5, wherein the first and second lines are connected to the vapor filter by a distribution piece.

7. The method recited in claim 5, further comprising opening, of the first and second lines, only that line having a greater negative pressure applied thereto.

8. The method recited in claim 5, wherein each of the first and second lines include a nonreturn valve configured to close the respective line.

9. The method recited in claim 6, wherein each of the first and second lines include a nonreturn valve configured to close the respective line.

10. The method recited in claim 7, wherein each of the first and second lines include a nonreturn valve configured to close the respective line.

11. The method recited in claim 1, wherein the vapor filter is an adsorption filter.

* * * * *